(No Model.)

D. J. RUSSELL.
APPARATUS FOR PRESSING ANIMAL AND VEGETABLE SUBSTANCES.

No. 250,979. Patented Dec. 13, 1881.

Witnesses.
Robert Everett,
J. A. Rutherford

Inventor:
David J. Russell.
By James L. Norris.
Atty.

UNITED STATES PATENT OFFICE.

DAVID J. RUSSELL, OF NEW BEDFORD, MASSACHUSETTS.

APPARATUS FOR PRESSING ANIMAL AND VEGETABLE SUBSTANCES.

SPECIFICATION forming part of Letters Patent No. 250,979, dated December 13, 1881.

Application filed November 15, 1881. (No model.)

*To all whom it may concern:*

Be it known that I, DAVID J. RUSSELL, a citizen of the United States, residing at New Bedford, in the county of Bristol and State of Massachusetts, have invented new and useful Improvements in Apparatus for Pressing Animal and Vegetable Substances, of which the following is a specification.

My invention relates to apparatus for pressing animal and vegetable substances of various kinds, and is particularly adapted for use as an oil-press for pressing oil from whale scraps and like material.

The invention consists in the combination, with an oblong rectangular vat having a perforated false bottom and a perforated bulk-head near one end, of a screw passing horizontally through the opposite end of the vat, a perforated follower swiveled to the inner end of said screw, and a perforated metallic hoop or basket adapted to be removably placed within the vat between the bulk-head and follower, as hereinafter more fully described and claimed.

Figure 1:
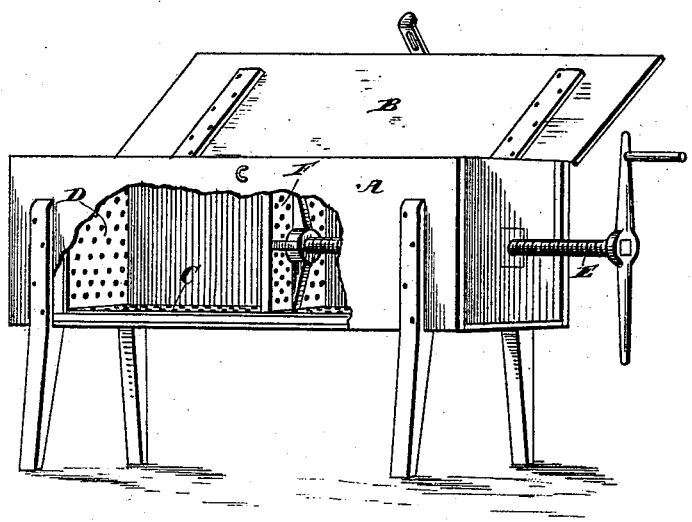
Figure 2:
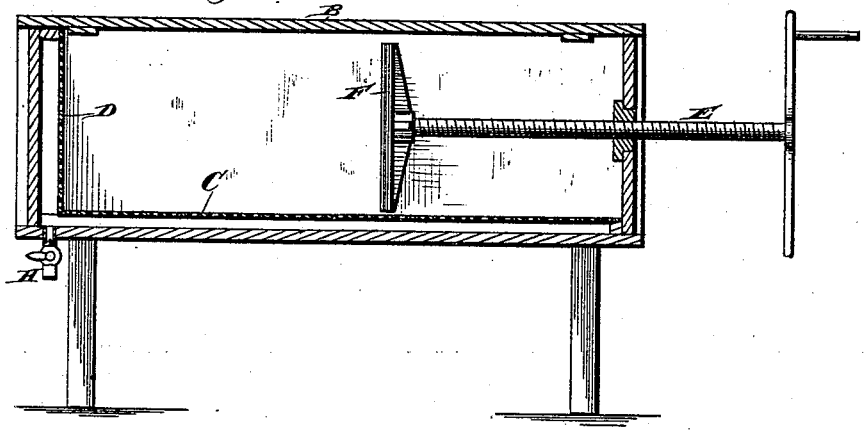
Figure 3:
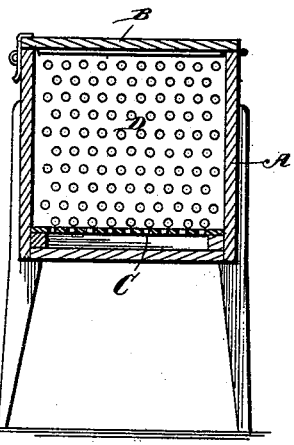
Figure 4:
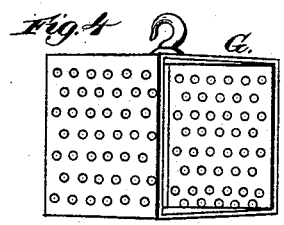

In the annexed drawings, Figure 1 is a perspective view of my improved press, partly broken away to show its interior. Fig. 2 is a vertical longitudinal section. Fig. 3 is a transverse section, and Fig. 4 is a view of the perforated hoop or basket.

Like parts are indicated by like letters in the several views.

The letter A denotes an oblong rectangular vat, supported on suitable legs or standards, and provided with a cover, B, which is preferably hinged to one side of the vat and furnished with convenient devices for securing the same when closed. This vat is further provided with a perforated false bottom, C, preferably composed of metal, which is arranged so as to leave a space between it and the real bottom of the vat. Near one end of the vat is a perforated metallic bulk-head, D, an intervening space being left between the same and the end of the vat.

Through a bearing-nut let into the opposite end of the vat is passed a screw, E, which carries at its outer end a suitable wheel or levers for turning it, while the inner end is swiveled to a follower consisting of a perforated head or plate, F, which is thus forced back and forth within the vat by the revolution of the screw.

A rectangular hoop or basket, G, composed of perforated or foraminous material, preferably metal, is constructed with open ends and of such dimensions as to fit within the sides of the vat. This hoop or basket is provided with means for lowering it therefrom, and when in position rests with one open end against the perforated bulk-head.

The purpose of the perforated basket is to afford a convenient means of removing the pressed or crushed materials, while the liquids resulting from the pressure exerted by the follower or perforated plate F are allowed to escape freely into the vat.

An exit-tube, H, is provided for withdrawing the liquid contents of the vat, when desired.

This apparatus is adapted for pressing various animal and vegetable substances, but is particularly designed for pressing oil from whale scraps and like material. When the blubber of the whale has been cut up and boiled in try-pots the scraps, after being removed from the pots, may be placed in this machine, and by pressure made to yield large quantities of oil. The screw having been revolved so as to draw the attached plate or follower back, the hoop or basket G is lowered into the vat in such position as to rest against the perforated bulk-head D. The material to be pressed is now put into the vat and its cover securely closed. By applying power to the screw E the perforated plate or follower F will be carried forward with the effect of exerting pressure upon the scraps or other material, so as to force it within the basket, while the oil or other liquids escape on all sides through the perforations in the basket, bulk-head, and follower, and enter the body of the inclosing vat, whence it may be withdrawn as required. After sufficient pressure has been exerted the basket or perforated hoop, together with the pressed scraps contained therein, is removed, and being emptied and again placed in position, more scraps are introduced within the vat, and the operation repeated.

The perforated hoop or basket may be dispensed with, if desired, in which case, however, the crushed or pressed materials remaining in the vat could not be so conveniently removed as by the employment of said basket.

Having thus described my invention, what I claim, and desire to secure by Letters Patent, is—

1. The combination, with an oblong rectangular vat having a perforated false bottom and bulk-head, of a screw passing horizontally through one end of the vat and a perforated follower swiveled to the inner end of said screw, substantially as shown and described.

2. The combination, with a rectangular vat having a perforated bulk-head near one end, a perforated false bottom, and a perforated follower swiveled to a screw passing through the end of the vat, of a perforated rectangular hoop or basket adapted to rest between the follower and bulk-head, substantially as shown and described.

3. The combination, with the vat A, having cover B, perforated false bottom C, and bulk-head D, and outlet H, of the screw E, passing through one end of the vat, perforated follower F, swiveled to said screw, and perforated hoop or basket G, placed between said bulk-head and follower, and adapted to receive the pressed material, substantially as shown and described.

In testimony whereof I have hereunto set my hand in the presence of two subscribing witnesses.

DAVID J. RUSSELL.

Witnesses:
H. N. MASON,
F. A. MILLIKEN.